(12) United States Patent
Weng et al.

(10) Patent No.: US 11,334,077 B2
(45) Date of Patent: May 17, 2022

(54) METHOD AND DEVICE FOR LOCATING FAULTY PHOTOVOLTAIC PANEL, AND UNMANNED AERIAL VEHICLE

(71) Applicant: SZ DJI TECHNOLOGY CO., LTD., Shenzhen (CN)

(72) Inventors: Chao Weng, Shenzhen (CN); Zefei Li, Shenzhen (CN); Chang Liu, Shenzhen (CN); Mingxi Wang, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/728,235

(22) Filed: Dec. 27, 2019

(65) Prior Publication Data

US 2020/0201333 A1   Jun. 25, 2020

Related U.S. Application Data

(63) Continuation of application No. PCT/CN2017/104014, filed on Sep. 28, 2017.

(51) Int. Cl.
*G05D 1/00* (2006.01)
*B64C 39/02* (2006.01)
(Continued)

(52) U.S. Cl.
CPC ......... *G05D 1/0094* (2013.01); *B64C 39/024* (2013.01); *B64D 47/08* (2013.01);
(Continued)

(58) Field of Classification Search
CPC ...... G05D 1/0094; G05D 1/101; H04N 7/185; H04N 5/2257; H04N 5/2253;
(Continued)

(56) References Cited

U.S. PATENT DOCUMENTS 6,132,585 A * 10/2000 Midorikawa ......... H01L 31/208
  205/123
10,036,716 B2 * 7/2018 Uetaki .................. B64D 45/00
(Continued)

FOREIGN PATENT DOCUMENTS

CN    102158641 A    8/2011
CN    104457704 A    3/2015
(Continued)

OTHER PUBLICATIONS

The World Intellectual Property Organization (WIPO) International Search Report for PCT/CN2017/104014 dated Jun. 28, 2018 7 Pages (including translation).

*Primary Examiner* — John W Miller
*Assistant Examiner* — Sean N. Haiem
(74) *Attorney, Agent, or Firm* — Anova Law Group, PLLC

(57) ABSTRACT

A method for locating a faulty photovoltaic (PV) panel includes controlling an unmanned aerial vehicle (UAV) to fly and perform image capturing, obtaining image information of the PV panel captured by a camera carried by the UAV, obtaining global positioning (GPS) information of the UAV and attitude information of the camera at a shooting time when the camera captures the image information, and, in response to determining that the image information includes fault information of the PV panel, determining a position of the PV panel according to the GPS information of the UAV and the attitude information of the camera at the shooting time.

22 Claims, 9 Drawing Sheets

(51) Int. Cl.
*B64D 47/08* (2006.01)
*G05D 1/10* (2006.01)
*H04N 7/18* (2006.01)
*H04N 5/225* (2006.01)

(52) U.S. Cl.
CPC ............ *G05D 1/101* (2013.01); *H04N 7/185* (2013.01); *B64C 2201/127* (2013.01); *B64C 2201/145* (2013.01); *H04N 5/2253* (2013.01)

(58) Field of Classification Search
CPC ............ B64C 39/024; B64C 2201/123; B64C 2201/127; B64C 2201/145; B64C 2201/12; G01S 19/42; H02S 50/15; G01C 21/00; B64D 47/08; Y02E 10/50
See application file for complete search history.

(56) References Cited

U.S. PATENT DOCUMENTS

| | | | |
|---|---|---|---|
| 10,207,801 B2* | 2/2019 | Garcia-Gabin | H02S 50/10 |
| 11,156,573 B2* | 10/2021 | Michini | H02S 50/10 |
| 2017/0205826 A1* | 7/2017 | Smith | B64C 39/024 |
| 2017/0349279 A1* | 12/2017 | Garcia-Gabin | H02S 50/10 |
| 2018/0003656 A1* | 1/2018 | Michini | H02S 50/10 |
| 2018/0184073 A1* | 6/2018 | Burgess | B64C 39/024 |
| 2019/0031344 A1* | 1/2019 | Hitchcock | G05D 1/0094 |

FOREIGN PATENT DOCUMENTS

| | | | | |
|---|---|---|---|---|
| CN | 105159297 A | | 12/2015 | |
| CN | 105700544 A | | 6/2016 | |
| CN | 105730705 A | | 7/2016 | |
| CN | 105811880 A | | 7/2016 | |
| CN | 105892485 A | | 8/2016 | |
| CN | 205469808 U | | 8/2016 | |
| CN | 106230376 A | | 12/2016 | |
| CN | 106954042 A | | 7/2017 | |
| CN | 107015560 A | * | 8/2017 | ............ G01J 5/0003 |
| CN | 107015560 A | | 8/2017 | |

* cited by examiner

METHOD AND DEVICE FOR LOCATING FAULTY PHOTOVOLTAIC PANEL, AND UNMANNED AERIAL VEHICLE

CROSS-REFERENCE TO RELATED APPLICATION

This application is a continuation of International Application No. PCT/CN2017/104014, filed on Sep. 28, 2017, the entire content of which is incorporated herein by reference.

TECHNICAL FIELD

The present disclosure relates to application of an unmanned aerial vehicle (UAV) and, more particularly, to a method, device, and UAV for locating faulty photovoltaic (PV) panels.

BACKGROUND

A photovoltaic (PV) panel is a device that converts light energy into electrical energy. The PV panel is very prone to failure due to the harsh working environment. Therefore, how to locate the faulty PV panels from the power generation field is very important for improving the capacity and the safety of the power generation.

With the continuous expansion of the application field of unmanned aerial vehicles (UAVs), the UAVs have become an important tool for locating the faulty PV panels. A high-precision electric field map is established using the three-dimensional (3D) reconstruction technologies, and a route is planned based on the high-precision electric field map, such that the UAV inspects the PV panels along the planned route. However, the requirements on the planned route for the UAV are very high, for example, the two adjacent rows of the PV panels cannot be simultaneously appeared in a shooting area of the UAV, and each row of PV panels corresponding to each route needs to be numbered. Furthermore, when locating the faulty PV panels, a grid calculation is only performed on one row of PV panels each time. Therefore, conventional technologies have high requirements on locating each photovoltaic panel, and have risks of accuracy loss and cumulative errors.

SUMMARY

In accordance with the disclosure, there is provided a method for locating a faulty photovoltaic (PV) panel including controlling an unmanned aerial vehicle (UAV) to fly and perform image capturing, obtaining image information of the PV panel captured by a camera carried by the UAV, obtaining global positioning (GPS) information of the UAV and attitude information of the camera at a shooting time when the camera captures the image information, and, in response to determining that the image information includes fault information of the PV panel, determining a position of the PV panel according to the GPS information of the UAV and the attitude information of the camera at the shooting time.

Also in accordance with the disclosure, there is provided a method for locating a faulty photovoltaic (PV) panel including an unmanned aerial vehicle (UAV) receiving preset route information sent by a remote-control device and including global positioning (GPS) information of position points on a preset route and attitude information of a camera corresponding to the GPS information, the UAV performing automatic flight and shooting according to the preset route information, and the UAV transmitting image information of the PV panel captured by the camera carried by the UAV and the GPS information of the UAV at a shooting time when the camera captures the image information of the PV panel to the remote-control device. The remote-control device determines the position of the PV panel according to the image information of the PV panel, and the GPS information of the UAV and the attitude information of the camera at the shooting time.

DETAILED DESCRIPTION OF THE EMBODIMENTS

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them.

Unless otherwise defined, all the technical and scientific terms used herein have the same or similar meanings as generally understood by one of ordinary skill in the art. As described herein, the terms used in the specification of the present disclosure are intended to describe example embodiments, instead of limiting the present disclosure. The term "and/or" used herein includes any suitable combination of one or more related items listed.

Example embodiments will be described with reference to the accompanying drawings. In the situation where the technical solutions described in the embodiments are not conflicting, they can be combined.

A method for locating a faulty photovoltaic (PV) panel consistent with the disclose can be implemented by a remote-control device of an unmanned aerial vehicle (UAV) or a controller carried by the UAV. Take the remote-control device as an example of an executive entity to describe the method for locating the faulty PV panel.

Figure 1:
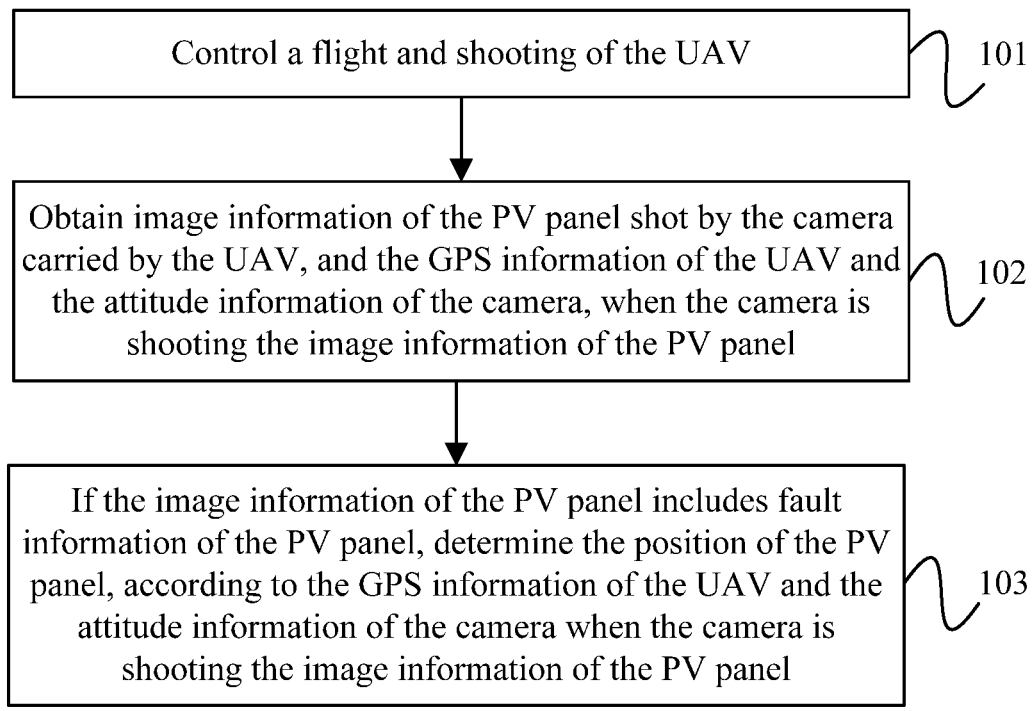
FIG. 1 is a schematic flow chart of a method for locating a faulty photovoltaic (PV) panel according to embodiments of the disclosure.

FIG. 1 is a schematic flow chart of the method for locating the faulty PV panel consistent with the disclosure. As shown in FIG. 1, at 101, a flight and shooting of the UAV are controlled.

Figure 2:
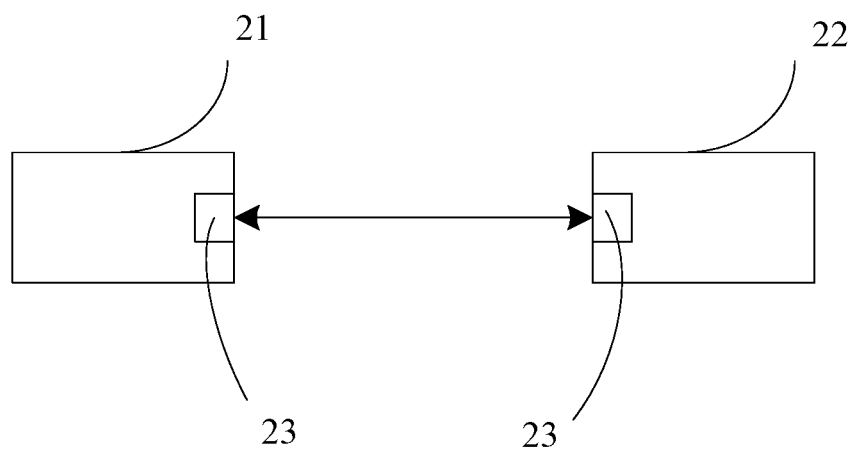
FIG. 2 schematically shows a connection between a remote-control device and an unmanned aerial vehicle (UAV) according to embodiments of the disclosure.

FIG. 2 schematically shows a connection between a remote-control device 21 and a UAV 22 consistent with the disclosure. In some embodiments, the remote-control device 21 can include a device having computing functions and/or processing capabilities, for example, a remote controller, a smart phone, a tablet, a laptop, a watch, a wristband, or the like, or any combination thereof.

As shown in FIG. 2, the remote-control device 21 and the UAV 22 are connected by an Application Programming Interface (API) 23. In some embodiments, the remote-control device 21 and the UAV 22 can be connected in a wireless manner including, for example, at least one of the Wireless-Fidelity (Wi-Fi), Bluetooth, software-defined radio (SDR), or another custom protocol.

The method for controlling the flight and shooting of the UAV will be described below. In some embodiments, the user can control the UAV to fly and shoot by manipulating the remote-control device of the UAV. Therefore, the UAV does not need a preset route. In some other embodiments, the preset route can be sent to the UAV by the remote-control device, such that the UAV can performs automatic flight and shooting according to the preset route.

For example, when the route is being planned, the UAV can be controlled to fly in a preset area (e.g., a PV power generation field), and a map of the entire preset area can be obtained. The route can be preset for the UAV based on the map, such that the preset route can include global positioning (GPS) information of all position points on the route, and attitude information of a camera corresponding to the GPS information.

Figure 3A:
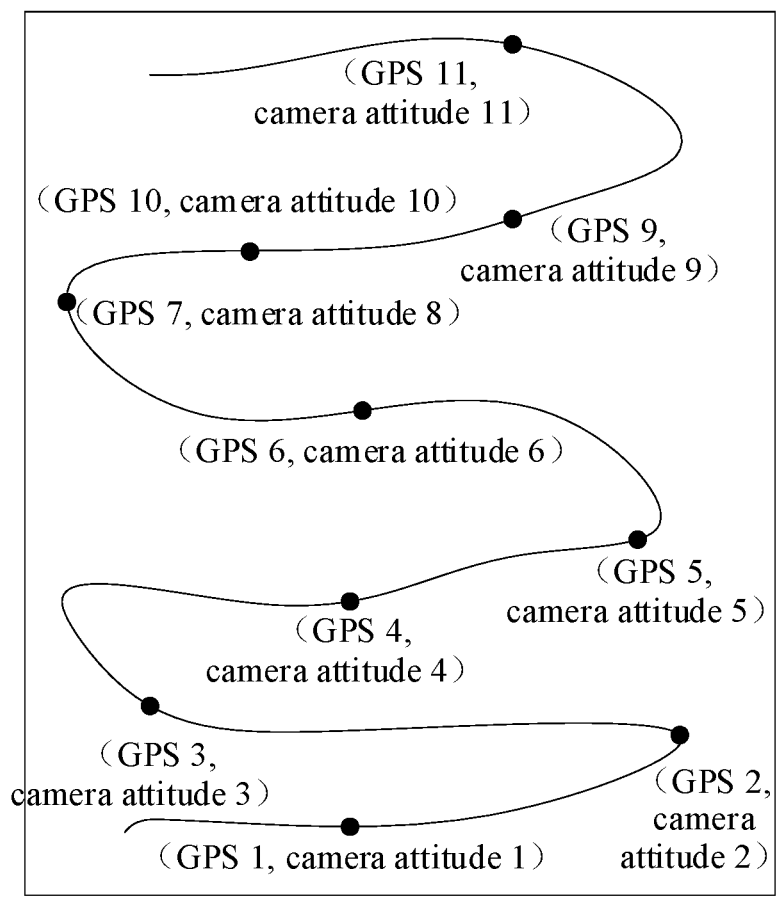
FIG. 3a is a schematic diagram of a preset route according to embodiments of the disclosure.
Figure 3B:
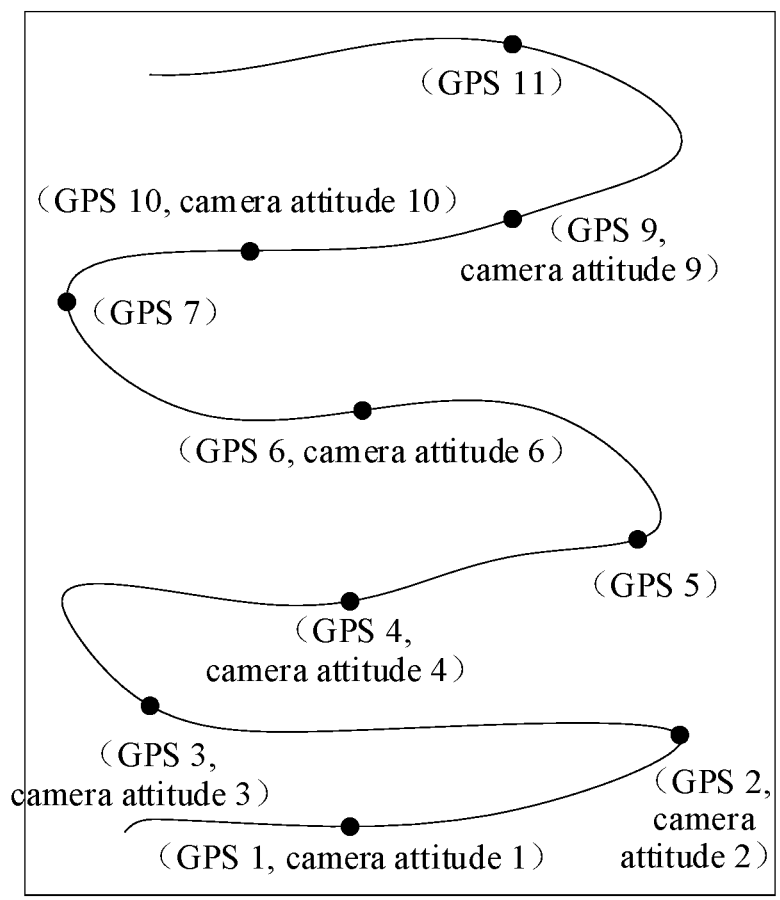
FIG. 3b is a schematic diagram of another preset route according to embodiments of the disclosure.

FIG. 3a is a schematic diagram of the preset route consistent with the disclosure. In some embodiments, as shown in FIG. 3a, the preset route includes the GPS information for all the position points on the preset route, and the attitude information of the camera corresponding to each position point. FIG. 3b is a schematic diagram of another preset route consistent with the disclosure. In some embodiments, as shown in FIG. 3b, the preset route can include first position points indicating a flight path of the UAV and second position points indicating shooting positions. The preset route can include the GPS information corresponding to each of the first position points and each of the second position points, and the attitude information of the camera corresponding to each of the second position points.

In some embodiments, the attitude information of the camera can indicate an attitude and an angle of the camera when the camera is shooting. In some embodiments, the attitude information of the camera can be determined, according to at least one of attitude information of the UAV or attitude information of a gimbal mounted at the UAV and carrying the camera. The attitude information of the UAV can include, e.g., an attitude angle of the UAV, and the attitude information of the gimbal can include, e.g., an attitude angle of the gimbal. In some embodiments, when the camera is mounted at the gimbal, the attitude information of the camera can include the attitude angle of the UAV and the attitude angle of the gimbal. When the camera is directly mounted at the UAV, the attitude information of the camera can include a shooting attitude and a shooting angle of the camera.

At 102, image information of the PV panel captured by the camera carried by the UAV, and the GPS information of the UAV and the attitude information of the camera, when the camera is capturing the image information of the PV panel, are obtained. The time at which the camera captures the image information of the PV panel is also referred to as a "shooting time."

The UAV can include the following configuration modes. In some embodiments, the UAV can carry only an infrared camera. The UAV can transmit obtained infrared image information of the PV panel to the remote-control device during flight.

In some embodiments, the UAV can carry a visible light camera and the infrared camera at the same time. The UAV can simultaneously shoot the infrared image and a visible light image during flight, and can simultaneously transmit the infrared image and a visible light image obtained simultaneously to the remote-control device. The infrared image and the visible light image obtained simultaneously can coincide with each other.

In some other embodiments, the UAV can carry only the visible light camera. The UAV can transmit obtained visible image information of the PV panel to the remote-control device during flight.

Furthermore, when the UAV performs automatic flight and shooting according to the preset route, the UAV can also transmit the GPS information of the shooting position together with the image information to the remote-control device, such that the remote-control device can search for the corresponding attitude information of the camera on the preset route according to the GPS information.

For example, when the preset route includes the GPS information of all the position points and the attitude information of the camera corresponding to each position point, the UAV can perform the shooting at each position point on the preset route, and the obtained image and the corresponding GPS information can be sent to remote-control device. Some of the obtained images can include the image information of the PV panels, and others of the obtained images may not include the image information of the PV panels. The remote-control device can perform an image recognition processing on the received images to determine the images including the image information of the PV panels as target images from all the received images, and extract the image information of the PV panels from the target images. It can be appreciated that while transmitting the image to the remote-control device, the UAV can also transmit the GPS information when the image is shoot. Therefore, when the target images are determined, the corresponding GPS information when the target images are shot can be obtained.

When the preset route includes the first position points, the second position points, the GPS information of the first position points, the GPS information of the second position points, and the attitude information of the camera corresponding to each second position point, the UAV can shoot only at the second position points according to the attitude information of the camera corresponding to the second position points. The remote-control device can receive the image information of the PV panel captured by the camera at the second position points, and the corresponding GPS information of the second position points.

In some embodiments, when the flight and shooting of the UAV are controlled by the user, the UAV can send the image information of the PV panel, the GPS information of the shooting position, and the attitude angle information of the camera to the remote-control device.

At 103, if the image information of the PV panel includes fault information of the PV panel, the position of the PV panel is determined, according to the GPS information of the UAV and the attitude information of the camera when the camera is capturing the image information of the PV panel.

In some embodiments, if the image information of the PV panel received by the remote-control device includes the infrared image information of the PV panel, and a temperature of at least one region in the image of the PV panel is significantly higher than the temperature of other regions, the PV panel having a hot spot or other failures that can cause the temperature of the PV panel to be high can be determined. If the image information of the PV panel received by the remote-control device includes the visible light image information of the PV panel, and the image shows that a certain region of a surface of the PV panel is damaged or dirty, the PV panel having a fouling fault can be determined.

In some embodiments, when it is determined that the image information of the PV panel includes the fault information of the PV panel, the remote-control device can reproduce an environment in which the UAV is located according to the GPS information of the UAV and the attitude information of the camera at the time the image information is obtained. As such, the PV panel shot by the UAV at the time can be determined, thus the position of the faulty PV panel can be determined.

In some embodiments, after determining the position of the faulty PV panel, the method can further include outputting the position of the faulty PV panel. In some embodiments, the remote-control device can output the position of the faulty PV panel using voice or text.

Figure 4:
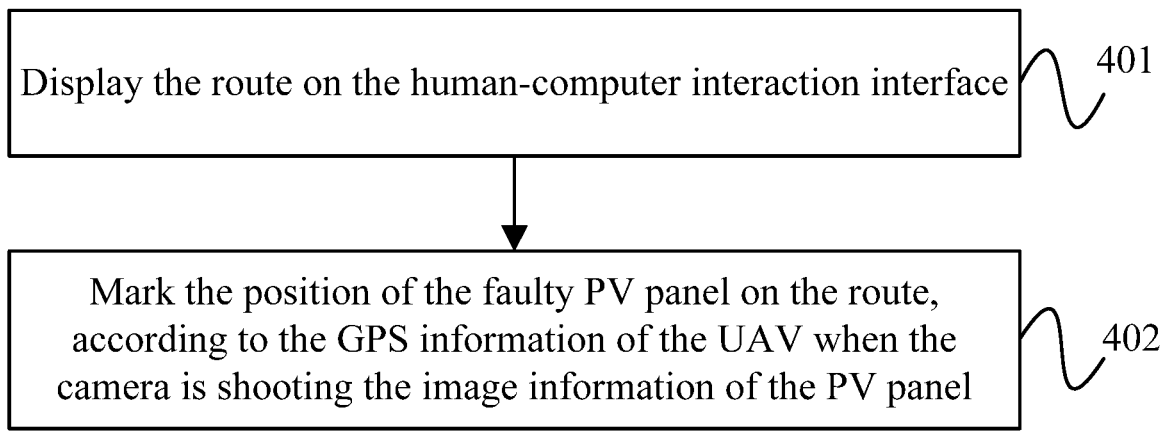
FIG. 4 is a schematic flow chart of a method for outputting a position of a faulty PV panel according to embodiments of the disclosure.

In some other embodiments, the remote-control device can output the position of the faulty PV panel on a human-computer interaction interface using a graphical representation. FIG. 4 is a schematic flow chart of the method for outputting the position of the faulty PV panel consistent with the disclosure. As shown in FIG. 4, at 401, the route is displayed on the human-computer interaction interface.

At 402, the position of the faulty PV panel is marked on the route, according to the GPS information of the UAV when the camera is capturing the image information of the PV panel.

Figure 5A:
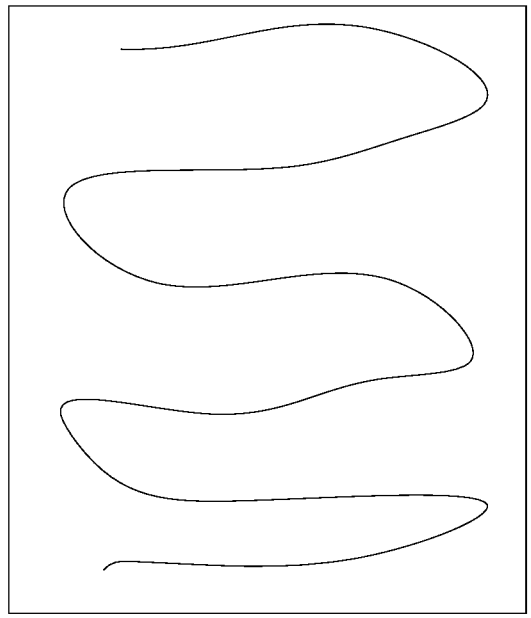
FIG. 5a schematically shows a route according to embodiments of the disclosure.
Figure 5B:
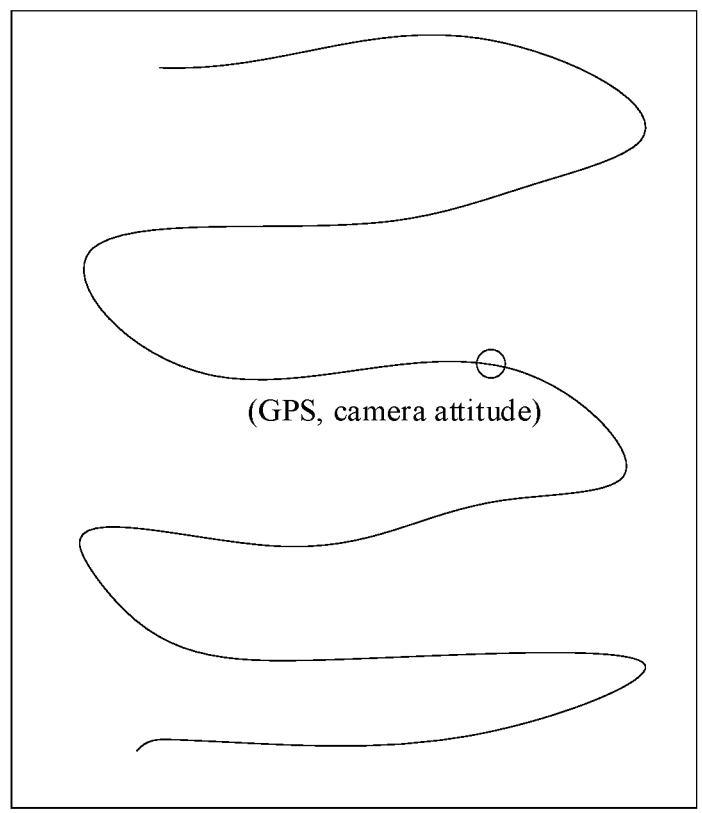
FIG. 5b schematically shows a position of a faulty PV panel in the route of FIG. 5a according to embodiments of the disclosure.

FIG. 5a schematically shows the route consistent with the disclosure. FIG. 5b schematically shows the position of the faulty PV panel on the route of FIG. 5a consistent with the disclosure. As shown in FIGS. 5a and 5b, the curve shows the route of the UAV, and the position of a hollow circle mark indicates the position of the faulty PV panel. In some embodiments, when the position of the faulty PV panel is marked, the GPS information of the UAV and the attitude information of the camera, when the photovoltaic panel at the position is shoot, can be marked simultaneously. It can be appreciated that the description is merely example and not intended to limit the disclosure.

In some embodiments, in order to display the position of the faulty PV panel more intuitively, a relationship between the image information of the faulty PV panel and the mark corresponding to the faulty PV panel on the route can be established, and a response mechanism can be established. When the user clicks the mark on the human-computer interaction interface, the remote-control device can obtain a click signal generated by a click action of the user, and display the image information associated with the mark to the user based on the click signal.

It can be appreciated by those skilled in the art that the above-described embodiments are merely taking the remote-control device as an example of the executive entity. When the executive entity is the controller arranged at the UAV, the implementations of the method can be similar to those when the executive entity is the remote-control device, and detailed description is omitted herein.

According to the method, the device, and the UAV for locating the faulty PV panel consistent with the disclosure, the image information of the PV panel captured by the camera carried by the UAV, and the GPS information of the UAV and the attitude information of the camera, when the camera is capturing the image information of the PV panel, can be obtained by controlling the flight and shooting of the UAV. When the fault information of the PV panel is included in the image information of the PV panel, the position of the faulty PV panel can be determined, according to the GPS information of the UAV and the attitude information of the camera when the camera captures the image information. Since the route does not need to be planned using the high-precision electric field map, using the 3D reconstruction technology to establish the high-precision electric field map is not needed, thereby reducing the workload and the work difficulty. Furthermore, according to the image information of the faulty PV panel, the GPS information of the UAV and the attitude information of the camera can be used to reproduce the environment, such that the position of the faulty PV panel can be determined according to the reproduced environment. Therefore, the requirement of only one row of the PV panels in the shooting area of the UAV, and locating the position of the faulty PV panel by the grid calculation are not needed, thereby reducing the requirement on the route planning for the UAV, avoiding the risks of accuracy loss and cumulative errors brought by the detection algorithm, e.g., the grid calculation, and improving the positioning accuracy of the faulty PV panel.

Figure 6:
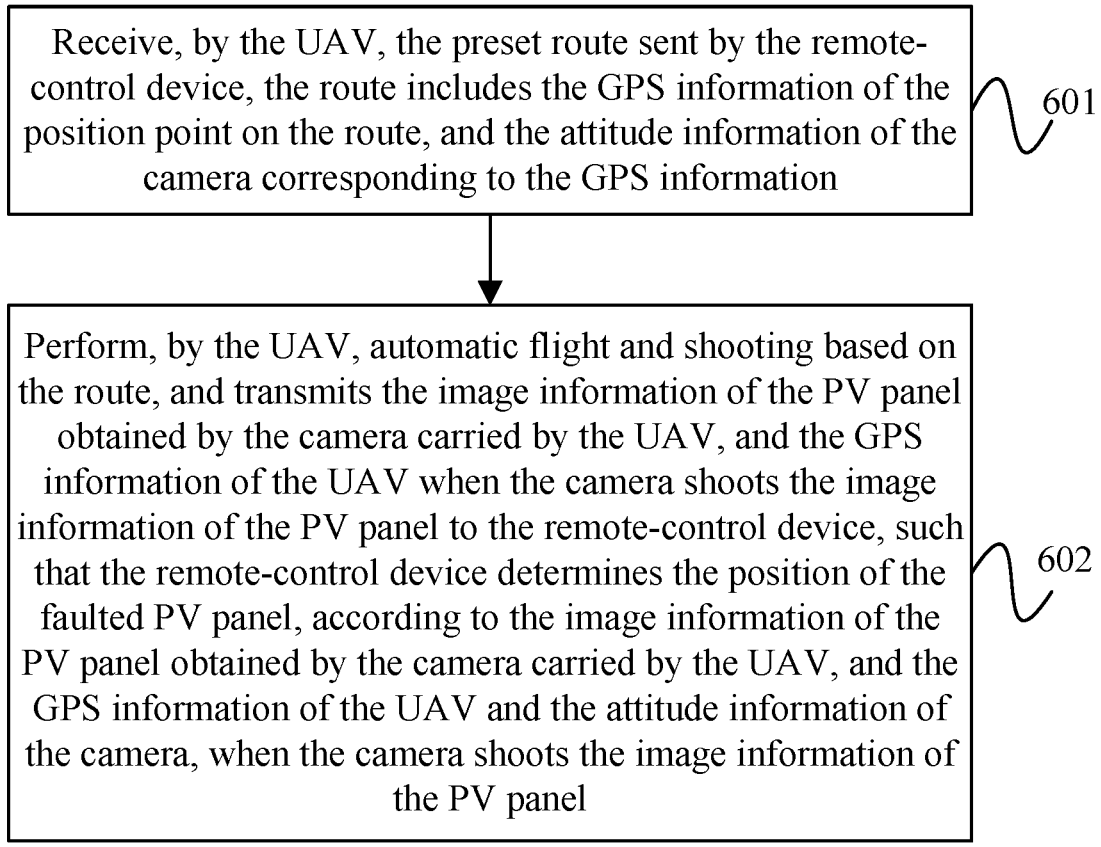
FIG. 6 is a schematic flow chart of another method for locating a faulty PV panel according to embodiments of the disclosure.

FIG. 6 is a schematic flow chart of another method for locating the faulty PV panel consistent with the disclosure. As shown in FIG. 6, at 601, the UAV receives the preset route sent by the remote-control device. The preset route includes the GPS information of the position point on the preset route, and the attitude information of the camera corresponding to the GPS information.

At S602, the UAV performs automatic flight and shooting based on the preset route, and transmits the image information of the PV panel captured by the camera carried by the UAV, and the GPS information of the UAV when the camera captures the image information of the PV panel to the remote-control device. The remote-control device determines the position of the faulted PV panel, according to the image information of the PV panel captured by the camera carried by the UAV, and the GPS information of the UAV and the attitude information of the camera, when the camera captures the image information of the PV panel.

In some embodiments, the UAV performing automatic flight and shooting based on the preset route, and transmitting the image information of the PV panel captured by the camera carried by the UAV, and the GPS information of the UAV, when the camera captures the image information of the PV panel, to the remote-control device can include the following processes. The UAV can perform automatic flight and shooting based on the preset route, and transmit the infrared image information of the PV panel captured by the infrared camera carried by the UAV and/or the visible image information of the PV panel captured by the visible light camera carried by the UAV to the remote-control device.

In some embodiments, the preset route can include the GPS information of all the position points on the preset route, and the attitude information of the camera corresponding to each position point. The UAV can shoot at all position points on the preset route by the camera carried by the UAV.

In some embodiments, the preset route can include the first position points and the second position points. The first position point can be configured to indicate the flight path of the UAV and the second position point can be configured to indicate the shooting position.

The preset route can include the GPS information corresponding to each of the first position points and each of the second position points, and the attitude information of the camera corresponding to each of the second position points.

In some embodiments, the attitude information of the camera can include the attitude information of the UAV and the attitude information of the gimbal.

The implementation of the method is similar to the method shown in FIG. 1, and detailed description is omitted herein.

Figure 7:
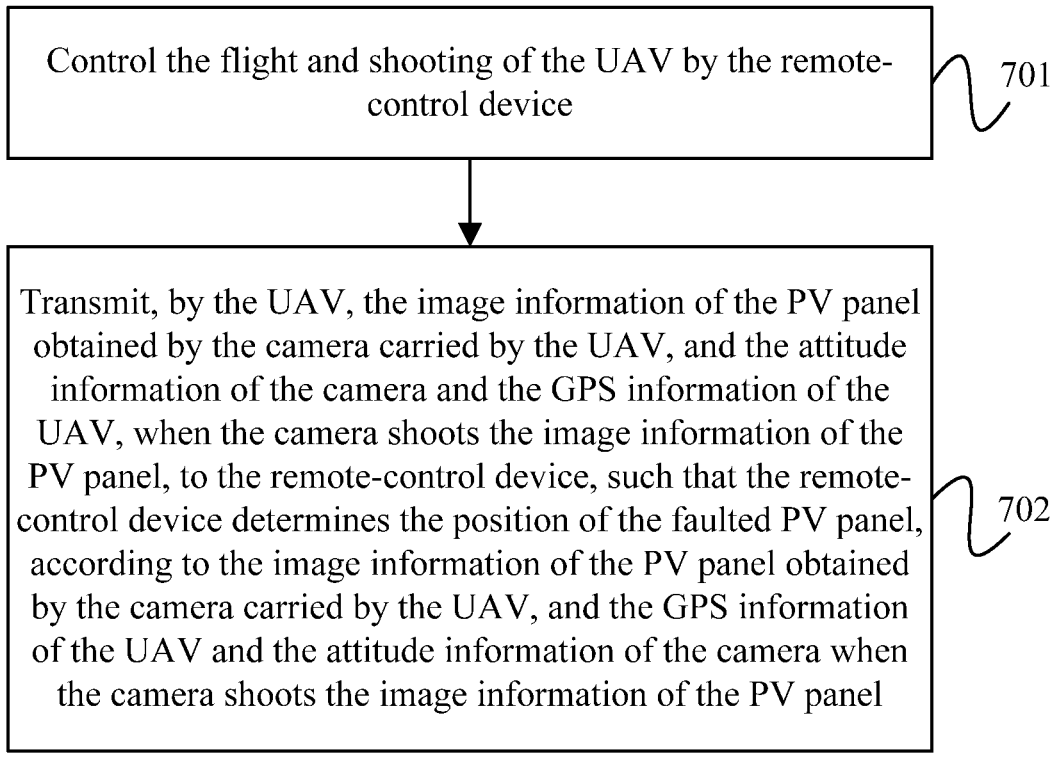
FIG. 7 is a schematic flow chart of another method for locating a faulty PV panel according to embodiments of the disclosure.

FIG. 7 is a schematic flow chart of another method for locating the faulty PV panel consistent with the disclosure. As shown in FIG. 7, at 701, the flight and shooting of the UAV are controlled by the remote-control device.

At 702, the UAV transmits the image information of the PV panel captured by the camera carried by the UAV, and the attitude information of the camera and the GPS information of the UAV, when the camera captures the image information of the PV panel, to the remote-control device. The remote-control device determines the position of the faulted PV panel, according to the image information of the PV panel captured by the camera carried by the UAV, and the GPS information of the UAV and the attitude information of the camera when the camera captures the image information of the PV panel.

In some embodiments, the UAV transmitting the image information of the PV panel captured by the camera carried by the UAV to the remote-control device can include the following processes. The UAV can transmit the infrared image information of the PV panel captured by the infrared camera carried by the UAV and/or the visible image information of the PV panel captured by the visible light camera carried by the UAV to the remote-control device.

In some embodiments, the attitude information of the camera can include the attitude information of the UAV and the attitude information of the gimbal.

Figure 8:
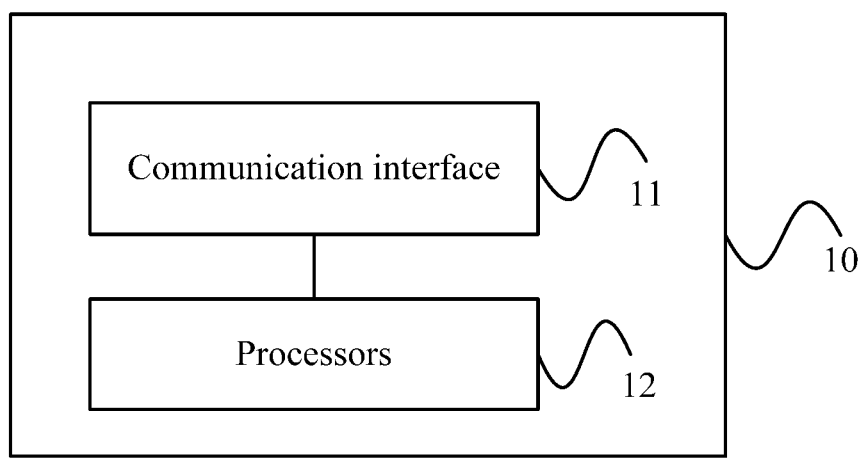
FIG. 8 is a schematic structural diagram of a remote-control device according to embodiments of the disclosure.

FIG. 8 is a schematic structural diagram of a remote-control device 10 consistent with the disclosure. As shown in FIG. 8, the remote-control device 10 includes a communication interface 11 and one or more processors 12. The one or more processors 12 can work together or separately, and the communication interface 11 is connected to the one or more processors 12. The one or more processors 12 can be configured to control the flight and shooting of the UAV via the communication interface 11. The communication interface 11 can be configured to obtain the image information of the PV panel captured by the camera carried by the UAV, and the GPS information of the UAV and the attitude information of the camera when the camera captures the image information of the PV panel. The one or more processors 12 can be configured, when the image information of the PV panel includes the fault information of the PV panel, to determine the position of the faulted PV panel, according to the GPS information of the UAV and the attitude information of the camera when the camera captures the image information of the PV panel.

In some embodiments, the communication interface 11 can be configured to send the preset route to the UAV, such that the UAV can perform automatic flight and shooting based on the preset route. The preset route can include the GPS information of the position point on the preset route, and the attitude information of the camera corresponding to the GPS information.

In some embodiments, the communication interface 11 can be configured to receive, from the UAV, the image information of the PV panel captured by the camera carried by the UAV, and the GPS information of the UAV when the camera captures the image information of the PV panel. The one or more processors 12 can be configured to search for the corresponding attitude information of the camera on the preset route according to the GPS information.

In some embodiments, the preset route can include the GPS information of all the position points and the attitude information of the camera corresponding to each position point.

In some embodiments, the communication interface 11 can be configured to receive, from the UAV, the images shot by the camera carried by the UAV at all the position points on the preset route. The one or more processors 12 can be configured to perform the image recognition processing on the received images to determine the target images including the image information of the PV panels. The one or more processors 12 can be further configured to obtain the GPS information when the target images are shot by the camera, and extract the image information of the PV panels from the target images.

In some embodiments, the preset route can include the first position points and the second position points. The first position points can include the second position points. The first position point can be configured to indicate the flight path of the UAV and the second position point can be configured to indicate the shooting position. The preset route can include the GPS information corresponding to each of the first position points and each of the second position points, and the attitude information of the camera corresponding to each of the second position points.

In some embodiments, the communication interface 11 can be configured to receive, from the UAV, the image information of the PV panel captured by the camera carried by the UAV at the second position points, and the corresponding GPS information of the second position points.

In some embodiments, the communication interface 11 can be configured to receive, from the UAV, the image information of the PV panel captured by the camera carried by the UAV, and the GPS information of the UAV and the attitude information of the camera, when the camera is capturing the image information of the PV panel.

In some embodiments, the communication interface 11 can be configured to obtain the infrared image information of the PV panel captured by the infrared camera carried by the UAV and/or the visible image information of the PV panel captured by the visible light camera carried by the UAV.

In some embodiments, the attitude information of the camera can include the attitude information of the UAV and the attitude information of the gimbal.

The remote-control device can be used to implement the method shown in FIG. 1. The specific implementation manner is similar to the implementation of the method shown in FIG. 1, and detail description is omitted herein.

Figure 9:
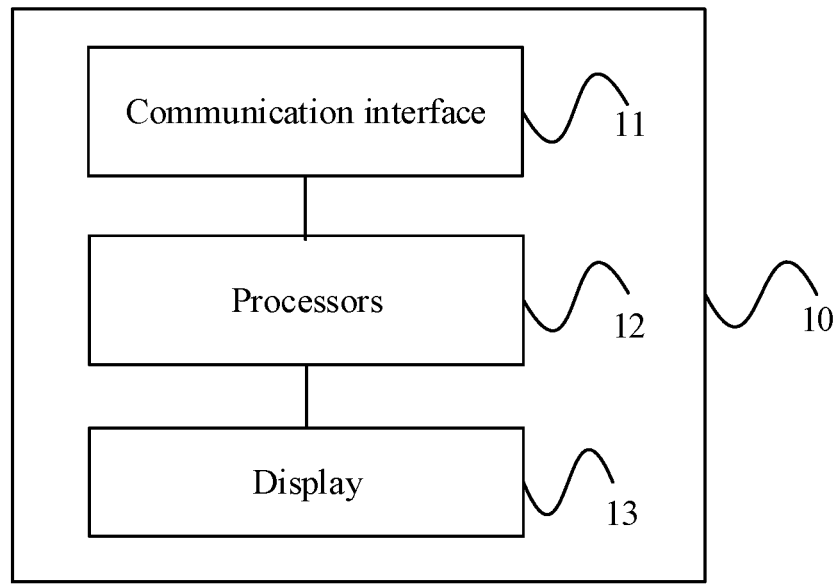
FIG. 9 is a schematic structural diagram of another remote-control device according to embodiments of the disclosure.

FIG. 9 is a schematic structural diagram of another example of the remote-control device 10 consistent with the disclosure. As shown in FIG. 9, the remote-control device 10 further includes a display 13. The display 13 is communicatively connected to the one or more processors 12. The display 13 can be configured to display the route on the human-computer interaction interface. The one or more processors 12 can be configured to mark the position of the faulty PV panel on the route, according to the GPS information of the UAV when the camera is capturing the image information of the PV panel, and display the position of the faulty PV panel via the display 13.

In some embodiments, the one or more processors 12 can be further configured to establish the relationship between the image information of the PV panel and the mark corresponding to the PV panel on the route.

In some embodiments, the display 13 can be further configured to obtain the click signal generated when the mark is clicked on the human-computer interaction interface, and display the image information associated with the mark, according to the relationship and the click signal.

In some embodiments, the communication interface 11 can be further configured to output the position of the faulty PV panel.

In some embodiments, the communication interface 11 can be further configured to output the position of the faulty PV panel using voice.

The remote-control device can be used to implement the method shown in FIG. 4. The specific implementation manner is similar to the implementation of the method shown in FIG. 4, and detail description is omitted herein.

Figure 10:
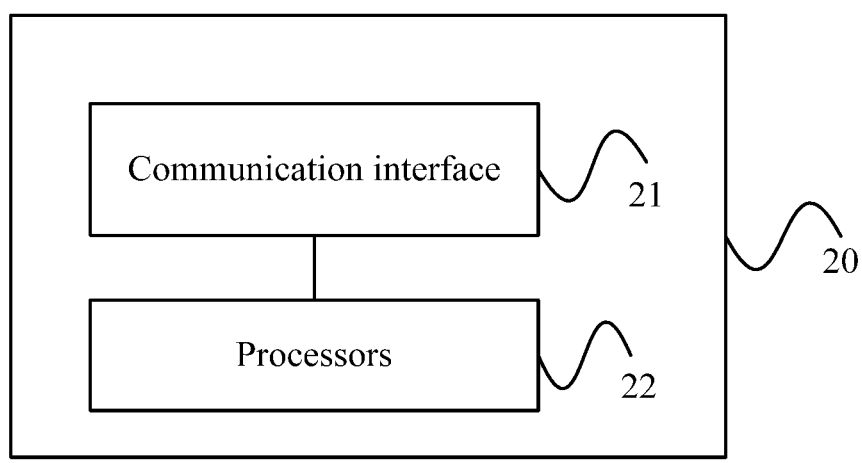
FIG. 10 is a schematic structural diagram of a UAV control device according to embodiments of the disclosure.

FIG. 10 is a schematic structural diagram of a UAV control device 20 consistent with the disclosure. As shown in FIG. 10, the UAV control device 20 includes a communication interface 21 and one or more processors 22. The one or more processors 22 can work together or separately, and the communication interface 21 is connected to the one or more processors 22. The communication interface 21 can be configured to receive the preset route sent by the remote-control device. The preset route can include the GPS information of the position point on the preset route, and the attitude information of the camera corresponding to the GPS information. In some embodiments, the one or more processors 22 can be configured to control the UAV to automatically fly and shoot based on the preset route. The communication interface 21 can be configured to send the image information of the PV panel captured by the camera carried by the UAV, and the GPS information of the UAV, when the camera captures the image information of the PV panel, to the remote-control device. As such, the remote-control device can determine the position of the faulted PV panel, according to the received image information of the PV panel, the GPS information of the UAV and the attitude information of the camera when the camera captures the image information of the PV panel.

In some embodiments, the communication interface 21 can be configured to send the infrared image information of the PV panel captured by the infrared camera carried by the UAV and/or the visible image information of the PV panel captured by the visible light camera carried by the UAV to the remote-control device.

In some embodiments, the preset route can include the GPS information of all position points on the route, and the attitude information of the camera at all position points.

In some embodiments, the one or more processors 22 can be configured to control the camera carried by the UAV to shoot at all position points on the preset route.

In some embodiments, the preset route can include the first position points and the second position points. The first position points can include the second position points. The first position point can be configured to indicate the flight path of the UAV and the second position point can be configured to indicate the shooting position. The preset route can include the GPS information corresponding to each of the first position points and each of the second position points, and the attitude information of the camera corresponding to each of the second position points.

In some embodiments, the one or more processors 22 can be configured to control the camera carried by the UAV to shoot at the second position points.

In some embodiments, the attitude information of the camera can include the attitude information of the UAV and the attitude information of the gimbal.

The UAV control device can be used to implement the method shown in FIG. 6. The specific implementation manner is similar to the implementation of the method shown in FIG. 6, and detail description is omitted herein.

Figure 11:
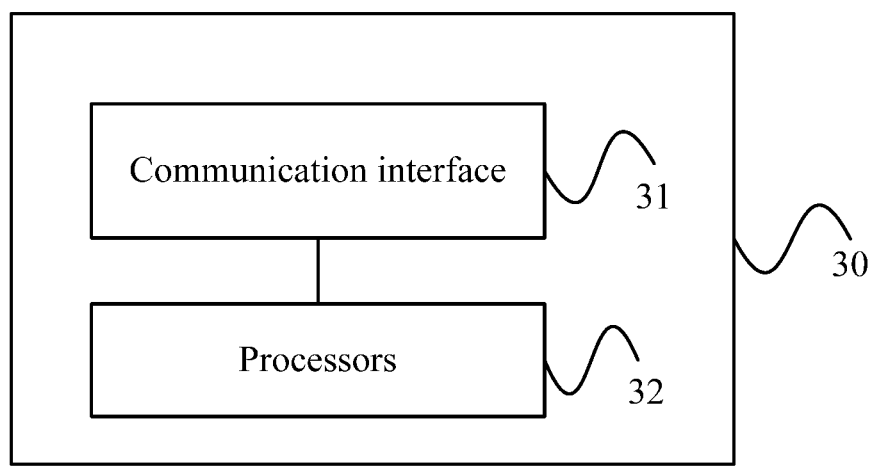
FIG. 11 is a schematic structural diagram of another UAV control device according to embodiments of the disclosure.

FIG. 11 is a schematic structural diagram of another example UAV control device 30 consistent with the disclosure. As shown in FIG. 11, the UAV control device 30 includes a communication interface 31 and one or more processors 32. The one or more processors 32 can work together or separately, and the communication interface 31 is connected to the one or more processors 32. The one or more processors 32 can be configured to control the flight and shooting of the UAV based on the control of the remote-control device. The communication interface 31 can be configured to transmit the image information of the PV panel captured by the camera carried by the UAV, and the attitude information of the camera and the GPS information of the UAV, when the camera captures the image information of the PV panel, to the remote-control device. As such, the remote-control device can determine the position of the faulted PV panel, according to the image information of the PV panel captured by the camera carried by the UAV, and the GPS information of the UAV and the attitude information of the camera when the camera captures the image information of the PV panel.

In some embodiments, the communication interface 31 can be configured to transmit the infrared image information of the PV panel captured by the infrared camera carried by the UAV and/or the visible image information of the PV panel captured by the visible light camera carried by the UAV to the remote-control device.

In some embodiments, the attitude information of the camera can include the attitude information of the UAV and the attitude information of the gimbal.

The UAV control device can be used to implement the method shown in FIG. 7. The specific implementation manner is similar to the implementation of the method shown in FIG. 7, and detail description is omitted herein.

The UAV consistent with the disclosure can include a power system arranged at a fuselage of the UAV, the infrared camera arranged at the fuselage and/or the visible light camera arranged at the fuselage, and the UAV control device shown in FIG. 10. The power system can be configured to provide a power for the flight of the UAV. The infrared camera can be configured to shoot the infrared image and the visible light camera can be configured to shoot the visible light image.

Another UAV consistent with the disclosure can include the power system arranged at the fuselage of the UAV, the infrared camera arranged at the fuselage and/or the visible light camera arranged at the fuselage, and the UAV control device shown in FIG. 11. The power system can be configured to provide a power for the flight of the UAV. The infrared camera can be configured to shoot the infrared image and the visible light camera can be configured to shoot the visible light image.

The disclosed systems, apparatuses, and methods may be implemented in other manners not described here. For example, the devices described above are merely illustrative. For example, the division of units may only be a logical function division, and there may be other ways of dividing the units. For example, multiple units or components may be combined or may be integrated into another system, or some features may be ignored, or not executed. Further, the coupling or direct coupling or communication connection shown or discussed may include a direct connection or an indirect connection or communication connection through one or more interfaces, devices, or units, which may be electrical, mechanical, or in other form.

The units described as separate components may or may not be physically separate, and a component shown as a unit may or may not be a physical unit. That is, the units may be located in one place or may be distributed over a plurality of network elements. Some or all of the components may be selected according to the actual needs to achieve the object of the present disclosure.

In addition, the functional units in the various embodiments of the present disclosure may be integrated in one processing unit, or each unit may be an individual physically unit, or two or more units may be integrated in one unit. The integrated unit described above can be implemented in electronic hardware, or in a combination of computer software and electronic hardware.

The integrated unit described above can be implemented in the form of computer software stored in a computer-readable storage medium. The computer software stored in a storage medium can include instructions that enable a computer device, such as a personal computer, a server, or a network device, to perform part or all of a method consistent with the disclosure, such as one of the example methods described above. The storage medium can be any medium that can store program codes, for example, a USB disk, a mobile hard disk, a read-only memory (ROM), a random-access memory (RAM), a magnetic disk, or an optical disk.

Those skilled in the art can appreciate that for simplification purposes, the division of the functional units described above is merely example. In practical applications, the functions can be assigned to be completed by different functional units according to the requirements. For example, the structure of the device can be divided into different functional units to implement all or some of the functions described above. Detailed descriptions of the implementation of example devices may be omitted and references can be made to the descriptions of the example methods.

It is intended that the embodiments be considered as example only and not to limit the scope of the disclosure.

Those skilled in the art will be appreciated that any modification or equivalents to the disclosed embodiments are intended to be encompassed within the scope of the present disclosure.

What is claimed is:

1. A method comprising:
    determining a preset route including global positioning (GPS) information of position points on the preset route and attitude information of a camera corresponding to the position points, a correspondence between the GPS information and the attitude information of the camera being determined based on the position points, and the camera being carried by an unmanned aerial vehicle (UAV);
    controlling the UAV to fly according to the preset route and perform image capturing based on the attitude information of the camera of the preset route;
    obtaining image information of a plurality of photovoltaic (PV) panels, the image information corresponding to an image captured by the camera at one position point of the position points;
    obtaining GPS information of the UAV at the one position point at a shooting time when the camera captures the image;
    based on the obtained GPS information of the UAV at the one position point, searching attitude information of the camera matching the one position point from a database recalling the attitude information of the camera at the shooting time, wherein the recalled attitude information of the camera is used for further analysis to determine a position of a faulty PV panel; and
    in response to determining that the image information includes fault information of the faulty PV panel:
        determining a fault region on the image, the fault region being a region containing the fault information; and
        determining the position of the faulty PV panel according to the GPS information of the UAV, the recalled attitude information of the camera at the shooting time, and the fault region.

2. The method of claim 1, wherein controlling the UAV to fly and perform image capturing includes:
    sending preset route information to the UAV, the preset route information indicative of the preset route.

3. The method of claim 2, wherein:
    obtaining the image information of the plurality of PV panels includes receiving, from the UAV, the image information of the plurality of PV panels; and
    obtaining the GPS information of the UAV at the one position point at the shooting time and searching the attitude information of the camera matching the one position point from the database recalling the attitude information of the camera at the shooting time based on the obtained GPS information of the UAV at the one position point include:
        receiving, from the UAV, the GPS information of the UAV at the one position point at the shooting time; and
        searching for the attitude information of the camera matching the one position point from the database recalling the attitude information of the camera in the preset route information according to the obtained GPS information of the UAV at the one position point.

4. The method of claim 3, wherein the preset route information includes the GPS information of all the position points on the preset route and the attitude information of the camera corresponding to the position points.

5. The method of claim 3, wherein the preset route information includes:
   first position points indicating a flight path of the UAV;
   second position points indicating shooting positions, the first position points including the second position points;
   GPS information of each of the first position points and each of the second position points; and
   attitude information of the camera at each of the second position points.

6. The method of claim 5, wherein:
   receiving the image information of the plurality of PV panels includes receiving, from the UAV, the image information of the plurality of PV panels captured at one of the second position points; and
   receiving the GPS information of the UAV includes receiving the GPS information of the one of the second position points.

7. The method of claim 2, wherein:
   obtaining the image information of the plurality of PV panels includes:
      receiving, from the UAV, images shot by the camera at all the position points on the preset route;
      performing image recognition on the received images to determine a target image that includes the image information of the plurality of PV panels; and
      extracting the image information of the plurality of PV panels from the target image; and
   obtaining the GPS information of the UAV at the shooting time includes obtaining the GPS information of the UAV at a time when the camera shoots the target image.

8. The method of claim 1, wherein:
   obtaining the image information of the plurality of PV panels includes receiving, from the UAV, the image information of the plurality of PV panels; and
   obtaining the GPS information of the UAV at the shooting time includes receiving, from the UAV, the GPS information of the UAV at the shooting time.

9. The method of claim 1, further comprising, after determining the position of the faulty PV panel:
   outputting the position of the faulty PV panel.

10. The method of claim 9, wherein outputting the position of the faulty PV panel includes:
    outputting the position of the faulty PV panel using voice.

11. The method of claim 9, wherein outputting the position of the faulty PV panel includes:
    displaying the preset route on a human-computer interaction interface; and
    marking the position of the faulty PV panel using a mark on the preset route according to the GPS information of the UAV at the shooting time.

12. The method of claim 11, further comprising, after determining the position of the faulty PV panel:
    establishing a relationship between the image information of the faulty PV panel and the mark corresponding to the position on the preset route.

13. The method of claim 12, further comprising, after establishing the relationship:
    obtaining a click signal generated when the mark is clicked on the human-computer interaction interface; and
    displaying the image information associated with the mark according to the relationship and the click signal.

14. The method of claim 1, wherein obtaining the image information of the plurality of PV panels captured by the camera includes:
    obtaining at least one of infrared image information of the plurality of PV panels captured by an infrared camera carried by the UAV or visible image information of the plurality of PV panels captured by a visible light camera carried by the UAV.

15. The method of claim 1, wherein the attitude information of the camera is determined according to at least one of attitude information of the UAV or attitude information of a gimbal mounted at the UAV and carrying the camera.

16. A method comprising:
    determining a preset route including global positioning (GPS) information of position points on the preset route and attitude information of a camera corresponding to the position points, a correspondence between the GPS information and the attitude information of the camera being determined based on the position points, and the camera being carried by an unmanned aerial vehicle (UAV);
    receiving, by the UAV, preset route information sent by a remote-control device, the preset route information indicative of the preset route;
    performing, by the UAV, automatic flight according to the preset route information and performing shooting based on the attitude information of the camera of the preset route;
    transmitting image information of a plurality of photovoltaic (PV) panels, the image information corresponding to an image captured by the camera at one position point, and the GPS information of the UAV at the one position point at a shooting time when the camera captures the image to the remote-control device;
    based on the obtained GPS information of the UAV at the one position point, searching attitude information of the camera matching the one position point from a database recalling the attitude information of the camera at the shooting time, wherein the recalled attitude information of the camera is used for further analysis to determine a position of a faulty PV panel; and
    in response to determining that the image information includes fault information of the PV panel:
       determining a fault region on the image, the fault region being a region containing the fault information; and
       determining, through the remote-control device, the position of the faulty PV panel according to the GPS information of the UAV, the recalled attitude information of the camera at the shooting time, and the fault region.

17. The method of claim 16, wherein transmitting the image information of the plurality of PV panels to the remote-control device includes:
    transmitting at least one of infrared image information of the plurality of PV panels captured by an infrared camera carried by the UAV or visible image information of the plurality of PV panels captured by a visible light camera carried by the UAV to the remote-control device.

18. The method of claim 16, wherein the preset route information includes GPS information of all of the position points and attitude information of the camera corresponding to each of the position points.

19. The method of claim 18, further comprising:
    shooting, by the UAV, images by the camera at all of the position points on the preset route.

20. The method of claim 16, wherein the preset route information includes:
- first position points indicating a flight path of the UAV;
- second position points indication shooting positions, the first position points including the second position points;
- GPS information corresponding to each of the first position points and each of the second position points; and
- attitude information of the camera corresponding to each of the second position points.

21. The method of claim 20, further comprising:
- shooting, by the UAV, images by the camera at the second position points on the preset route.

22. The method of claim 16, wherein the attitude information of the camera is determined according to at least one of attitude information of the UAV or attitude information of a gimbal mounted at the UAV and carrying the camera.

* * * * *